US006376634B1

(12) United States Patent
Nishikawa et al.

(10) Patent No.: US 6,376,634 B1
(45) Date of Patent: Apr. 23, 2002

(54) COMPOSITION FOR FILM FORMATION AND MATERIAL FOR INSULATING FILM FORMATION

(75) Inventors: Michinori Nishikawa; Kinji Yamada; Mayumi Kakuta; Yasutake Inoue; Masahiko Ebisawa; Satoko Hakamatsuka; Kentarou Tamaki, all of Ibaraki (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/585,275

(22) Filed: Jun. 2, 2000

(30) Foreign Application Priority Data

Jun. 4, 1999 (JP) .......................................... 11-158674
Dec. 13, 1999 (JP) .......................................... 11-352862

(51) Int. Cl.$^7$ ........................ C09D 183/04; C08G 77/04

(52) U.S. Cl. ............... 528/25; 106/287.13; 106/287.16; 106/287.1; 524/272; 524/357; 524/363; 528/12; 528/17; 528/20; 528/39

(58) Field of Search ............................. 528/17, 20, 39, 528/12, 25; 524/272, 357, 363; 106/287.13, 287.16, 287.1

(56) References Cited

U.S. PATENT DOCUMENTS

| | | | | |
|---|---|---|---|---|
| 4,865,649 | A | * | 9/1989 | Kashiwagi et al. |
| 5,089,303 | A | | 2/1992 | Deatcher et al. |
| 5,426,214 | A | * | 6/1995 | Chu et al. |
| 5,662,961 | A | * | 9/1997 | Tanitsu et al. |
| 5,998,522 | A | * | 12/1999 | Nakano et al. |
| 6,126,733 | A | * | 10/2000 | Wallace et al. |
| 6,214,104 | B1 | * | 4/2001 | Iida et al. |

FOREIGN PATENT DOCUMENTS

| | | | | |
|---|---|---|---|---|
| EP | 0 489 470 | | | 6/1992 |
| EP | 0 701 121 | | | 3/1996 |
| JP | 03-020377 | | | 1/1991 |
| JP | 04-320337 | | | 11/1992 |
| JP | 05-263045 | A | * | 10/1993 |
| JP | 08-130247 | | | 5/1996 |
| JP | 11-050007 | A | * | 2/1999 |

* cited by examiner

*Primary Examiner*—Robert Dawson
*Assistant Examiner*—Marc S. Zimmer
(74) *Attorney, Agent, or Firm*—Oblon, Spivak, McClelland, Maier & Neustadt, P.C.

(57) ABSTRACT

A composition for film formation which is useful as an interlayer insulating film material in the production of semiconductor devices and the like, and gives a coating film having excellent uniformity, low dielectric constant, low leakage current and excellent storage stability; and a material for insulating film formation using the composition.

The composition comprises (A) a product of hydrolysis and condensation obtained by hydrolyzing and condensing at least one compound selected from the group consisting of (A-1) compounds represented by the formula (1): $R^1_aSi(OR^2)_{4-a}$, and (A-2) compounds represented by the formula (2): $R^3_b(R^4O)_{3-b}Si—(R^7)_d—Si(OR^5)_{3-c}R^6_c$; and (B) a compound represented by the formula (3): $R^8O(CHCH_3CH_2O)_eR^9$.

28 Claims, No Drawings

COMPOSITION FOR FILM FORMATION AND MATERIAL FOR INSULATING FILM FORMATION

FIELD OF THE INVENTION

The present invention relates to a composition for film formation and a material for insulating film formation using the composition. More particularly, the present invention relates to a composition for film formation which is useful as an interlayer insulating film material in the production of semiconductor devices and the like, and gives a coating film having excellent uniformity, low dielectric constant, low leakage current and excellent storage stability.

BACKGROUND OF THE INVENTION

Silica ($SiO_2$) films formed by vacuum processes such as CVD method have hitherto been used frequently as interlayer insulating films in semiconductor devices and other devices. In recent years, an insulating coating film which comprises a tetraalkoxysilane hydrolyzate as the main component and is called an SOG (spin on glass) film has come to be used for the purpose of forming a more even interlayer insulating film. Furthermore, as a result of the trend toward higher degree of integration in semiconductor devices and the like, an interlayer insulating film has been developed which comprises a polyorganosiloxane as the main component, has a low dielectric constant, and is called an organic SOG film.

However, with further progress in the degree of integration or multilayer film formation in semiconductor devices and the like, better electrical insulation between conductors has come to be required and, hence, an interlayer insulating film material of low dielectric constant has come to be desired which gives a coating film having excellent uniformity, lower dielectric constant, low leakage current and excellent storage stability.

JP-A-6-181201 (the term "JP-A" as used herein means an "unexamined published Japanese patent application") discloses as an interlayer insulating film material a coating composition for forming an insulating film having a lower dielectric constant. This coating composition is intended to provide an insulating film for semiconductor devices which has low water absorption and excellent cracking resistance. This coating composition for insulating film formation comprises as the main component an oligomer having a number average molecular weight of 500 or higher obtained by condensation polymerizing an organometallic compound containing at least one element selected from titanium, zirconium, niobium and tantalum with an organosilicon compound having at least one alkoxy group in the molecule.

WO 96/00758 discloses a silica-type coating material for insulating film formation which is used for forming an interlayer insulating film in producing a multilayered printed circuit board. This coating material comprises an alkoxysilane, a metal alkoxide other than silanes, an organic solvent, etc., can be applied thickly, and gives a coating film having excellent resistance to an oxygen plasma.

Furthermore, JP-A-3-20377 discloses a coating solution for oxide film formation which is useful for surface planarization, interlayer insulation, etc., in producing electronic parts and the like. This coating solution for oxide film formation is intended to be provided as a homogeneous coating solution which is free from the generation of gel particles and from which a satisfactory oxide film having no cracks can be obtained even in the case where it has undergone high temperature curing or treatment with a prescribed plasma. This coating solution for oxide film formation is obtained by hydrolyzing and polymerizing a prescribed silane compound and a prescribed chelate compound in the presence of an organic solvent.

However, none of these conventional compositions for film formation give a coating film having excellent uniformity and have a satisfactory balance in low dielectric constant, low leakage current, storage stability and other properties.

Accordingly, one object of the present invention is to provide a film-forming composition that overcomes the problems described above.

Another object of the present invention is to provide a material for an interlayer insulating film which, when used for forming an interlayer insulating film in the production of semiconductor devices and the like, has an excellent balance in uniformity, low dielectric constant, low leakage current, storage stability and other properties of a coating film.

The present invention provides a composition for film formation which comprises:

(A) a product of hydrolysis and condensation (hereinafter referred to simply as a "product of hydrolysis and condensation") obtained by hydrolyzing and condensing at least one compound selected from the group consisting of (A-1) compounds represented by the following formula (1):

$$R^1_aSi(OR^2)_{4-a} \quad (1)$$

wherein $R^1$ represents hydrogen atom, fluorine atom or a monovalent organic group; $R^2$ represents a monovalent organic group; and a represents an integer of 0 to 2, and (A-2) compounds represented by the following formula (2):

$$R^3_b(R^4O)_{3-b}Si—(R^7)_d—Si(OR^5)_{3-c}R^6_c \quad (2)$$

wherein $R^3$, $R^4$, $R^5$ and $R^6$ may be the same or different and each represent a monovalent organic group; b and c may be the same or different and each represent a number of 0 to 2; $R^7$ represents oxygen atom or a group represented by $—(CH_2)_n—$, wherein n is 1 to 6; and d is 0 or 1; and (B) a compound represented by the following formula (3):

$$R^8O(CHCH_3CH_2O)_eR^9 \quad (3)$$

wherein $R^8$ and $R^9$ each independently represent hydrogen atom or a monovalent organic group selected from alkyl groups having 1 to 4 carbon atoms and $CH_3CO—$, provided that one of $R^8$ and $R^9$ is not hydrogen atom; and e represents an integer of 1 or 2.

The invention further provides a material for insulating film formation, which comprises the composition.

DETAILED DESCRIPTION OF THE INVENTION

The present invention is described in detail below.

Ingredient (A)

Ingredients (A-1)

Examples of the monovalent organic groups represented by $R^1$ and $R^2$ in the formula (1) include alkyl group, aryl group, allyl group and glycidyl group. In the formula (1), $R^1$ is preferably a monovalent organic group, especially alkyl group or phenyl group.

The alkyl group preferably has 1 to 5 carbon atoms, and examples thereof include methyl, ethyl, propyl and butyl.

Those alkyl groups may be linear or branched, and may be ones in which one or more of the hydrogen atoms have been replaced with, for example, fluorine atoms.

In the formula (1), examples of the aryl group include phenyl, naphthyl, methylphenyl, ethylphenyl, chlorophenyl, bromophenyl and fluorophenyl.

Specific examples of the compounds represented by the formula (1) include: trimethoxysilane, triethoxysilane, tri-n-propoxysilane, triisopropoxysilane, tri-n-butoxysilane, tri-sec-butoxysilane, tri-tert-butoxysilane, triphenoxysilane, fluorotrimethoxysilane, fluorotriethoxysilane, fluorotri-n-propoxysilane, fluorotriisopropoxysilane, fluorotri-n-butoxysilane, fluorotri-sec-butoxysilane, fluorotri-tert-butoxysilane, fluorotriphenoxysilane, tetramethoxysilane, tetraethoxysilane, tetra-n-propoxysilane, tetraisopropoxysilane tetra-n-butoxysilane, tetra-sec-butoxysilane, tetra-tert-butoxysilane and tetraphenoxysilane; methyltrimethoxysilane, methyltriethoxysilane, methyltri-n-propoxysilane, methyltri-iso-propoxysilane, methyltri-n-butoxysilane, methyltri-sec-butoxysilane, methyltri-tert-butoxysilane, methyltriphenoxysilane, ethyltrimethoxysilane, ethyltriethoxysilane, ethyltri-n-propoxysilane, ethyltri-iso-propoxysilane, ethyltri-n-butoxysilane, ethyltri-sec-butoxysilane, ethyltri-tert-butoxysilane, ethyltriphenoxysilane, vinyltrimethoxysilane, vinyltriethoxysilane, vinyltri-n-propoxysilane, vinyltri-iso-propoxysilane, vinyltri-n-butoxysilane, vinyltri-sec-butoxysilane, vinyltri-tert-butoxysilane, vinyltriphenoxysilane, n-propyltrimethoxysilane, n-propyltriethoxysilane, n-propyltri-n-propoxysilane, n-propyltri-iso-propoxysilane, n-propyltin-n-butoxysilane, n-propyltri-sec-butoxysilane, n-propyltri-tert-butoxysilane, n-propyltriphenoxysilane, isopropyltrimethoxysilane, isopropyltriethoxysilane, isopropyltri-n-propoxysilane, isopropyltriisopropoxysilane, isopropyltri-n-butoxysilane, isopropyltri-sec-butoxysilane, isopropyltri-tert-butoxysilane, isopropyltriphenoxysilane, n-butyltrimethoxysilane, n-butyltriethoxysilane, n-butyltri-n-propoxysilane, n-butyltriisopropoxysilane, n-butyltri-n-butoxysilane, n-butyltri-sec-butoxysilane, n-butyltri-tert-butoxysilane, n-butyltriphenoxysilane; sec-butyltrimethoxysilane, sec-butyl-i-triethoxysilane, sec-butyltri-n-propoxysilane, sec-butyltriisopropoxysilane, sec-butyltri-n-butoxysilane, sec-butyltri-sec-butoxysilane, sec-butyltri-tert-butoxysilane, sec-butyltriphenoxysilane, tert-butyltrimethoxysilane, tert-butyltriethoxysilane, tert-butyltri-n-propoxysilane, tert-butyltriisopropoxysilane, tert-butyltri-n-butoxysilane, tert-butyltri-sect-butoxysilane, tert-butyltri-tert-butoxysilane, tert-butyltriphenoxysilane, phenyltrimethoxysilane, phenyltriethoxysilane, phenyltri-n-propoxysilane, phenyltriisopropoxysilane, phenyltri-n-butoxysilane, phenyltri-sec-butoxysilane, phenyltri-tert-butoxysilane, phenyltriphenoxysilane, γ-aminopropyltrimethoxysilane, γ-aminopropyltriethoxysilane, γ-glycidoxypropyltrimethoxysilane, glycidoxypropyltriethoxysilane, γ-trifluoropropyltrimethoxysilane and γ-trifluoropropyltriethoxysilane; and dimethyldimethoxysilane, dimethyldiethoxysilane, dimethyldi-n-propoxysilane, dimethyldiisopropoxysilane, dimethyldi-n-butoxysilane, dimethyldi-sec-butoxysilane, dimethyldi-tert-butoxysilane, dimethyldiphenoxysilane, diethyldimethoxysilane, diethyldiethoxysilane, diethyldi-n-propoxysilane, diethyldiisopropoxysilane, diethyldi-n-butoxysilane, diethyldi-sec-butoxysilane, diethyldi-tert-butoxysilane, diethyldiphenoxysilane, di-n-propyldimethoxysilane, di-n-propyldimethoxysilane, di-n-propyldi-n-propoxysilane, di-n-propyldiisopropoxysilane, di-n-propyldi-n-butoxysilane, di-n-propyldi-sec-butoxysilane, di-n-propyldi-tert-butoxysilane, di-n-propyldiphenoxysilane, diisopropyldimethoxysilane, diisopropyldiethoxysilane, diisopropyldi-n-propoxysilane, diisopropyldiisopropoxysilane, diisopropyldi-n-butoxysilane, diisopropyldi-sec-butoxysilane, diisopropyldi-tert-butoxysilane, diisopropyldiphenoxysilane, di-n-butyldimethoxysilane, di-n-butyldiethoxysilane, di-n-butyldi-n-propoxysilane, di-n-butyldiisopropoxysilane, di-n-butyldi-n-butoxysilane, di-n-butyldi-sec-butoxysilane, di-n-butyldi-tert-butoxysilane, di-n-butyldiphenoxysilane, di-sec-butyldimethoxysilane, di-sec-butyldiethoxysilane, di-sec-butyldi-n-propoxysilane, di-sec-butyldiisopropoxysilane, di-sec-butyldi-n-butoxysilane, di-sec-butyldi-sec-butoxysilane, di-sec-butyldi-tert-butoxysilane, di-sec-butyldiphenoxysilane, di-tert-butyldimethoxysilane, di-tert-butyldiethoxysilane, di-tert-butyldi-n-propoxysilane, di-tert-butyldiisopropoxysilane, di-tert-butyldi-n-butoxysilane, di-tert-butyldi-sec-butoxysilane, di-tert-butyldi-tert-butoxysilane, di-tert-butyldiphenoxysilane, diphenyldimethoxysilane, diphenyldiethoxysilane, diphenyldi-n-propoxysilane, diphenyldiisopropoxysilane, diphenyldi-n-butoxysilane, diphenyldi-sec-butoxysilane, diphenyldi-tert-butoxysilane, diphenyldiphenoxysilane and divinyltrimethoxysilane.

Of those, the preferred compounds are tetramethoxysilane, tetraethoxysilane, tetra-n-propoxysilane, tetraisopropoxysilane, tetraphenoxysilane, methyltrimethoxysilane, methyltriethoxysilane, methyltri-n-propoxysilane, methyltriisopropoxysilane, ethyltrimethoxysilane, ethyltriethoxysilane, vinyltrimethoxysilane, vinyltriethoxysilane, phenyltrimethoxysilane, phenyltriethoxysilane, dimethyldimethoxysilane, dimethyldiethoxysilane, diethyldimethoxysilane, diethyldiethoxysilane, diphenyldimethoxysilane, diphenyldiethoxysilane, trimethylmonomethoxysilane, trimethylmonoethoxysilane, triethylmonomethoxysilane, triethylmonoethoxysilane, triphenylmonomethoxysilane and triphenylmonoethoxysilane.

Those compounds may be used alone or as a mixture of two or more thereof.

Ingredients (A-2)

Examples of the monovalent organic group in the formula (2) include the same organic groups as those enumerated above with regard to the formula (1).

Examples of the compound represented by the formula (2) wherein $R^7$ is oxygen atom include hexamethoxydisiloxane, hexaethoxydisiloxane, hexaphenoxydisiloxane, 1,1,1,3,3-pentamethoxy-3-methyldisiloxane, 1,1,1,3,3-pentaethoxy-3-methyldisiloxane, 1,1,1,3,3-pentamethoxy-3-phenyldisiloxane, 1,1,1,3,3-pentaethoxy-3-phenyldisiloxane, 1,1,3,3-tetramethoxy-1,3-dimethyldisiloxane, 1,1,3,3-tetraethoxy- 1,3-dimethyldisiloxane, 1,1,3,3-tetramethoxy-1,3-diphenyldisiloxane, 1,1,3,3-tetraethoxy-1,3-diphenyldisiloxane, 1,1,3-trimethoxy-1,3,3-trimethyldisiloxane, 1,1,3-triethoxy-1,3,3-trimethyldisiloxane, 1,1,3-trimethoxy-1,3,3-triphenyldisiloxane, 1,1,3-triethoxy-1,3,3-triphenyldisiloxane, 1,3-dimethoxy-1,1,3,3-tetramethyldisiloxane, 1,3-diethoxy-1,1,3,3-tetramethyldisiloxane, 1,3-dimethoxy-1,1,3,3-tetraphenyldisiloxane and 1,3-diethoxy-1,1,3,3-tetraphenyldisiloxane. Of those, preferred compounds are hexamethoxydisiloxane, hexaethoxydisiloxane, 1,1,3,3-tetramethoxy-1,3-dimethyldisiloxane, 1,1,3,3-tetraethoxy-1,3-dimethyldisiloxane, 1,1,3,3-tetramethoxy-1,3-diphenyldisiloxane, 1,3-dimethoxy-1,1,3,3-tetramethyldisiloxane, 1,3-diethoxy-1,1,3,3-tetramethyldisiloxane, 1,3-dimethoxy-1,1,3,3-tetraphenyldisiloxane and 1,3-diethoxy-1,1,3,3-tetraphenyldisiloxane.

Examples of the compound represented by the formula (2) wherein d is 0 include hexamethoxydisilane, hexaethoxydisilane, hexaphenoxydisilane, 1,1,1,2,2-pentamethoxy-2-methyldisilane, 1,1,1,2,2-pentaethoxy-2-methyldisilane, 1,1,1,2,2-pentamethoxy-2-phenyldisilane, 1,1,1,2,2-pentaethoxy-2-phenyldisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy- 1,2-diphenyldisilane, 1,1,2-trimethoxy-1,2,2-trimethyldisilane, 1,1,2-triethoxy-1,2,2-trimethyldisilane, 1,1,2-trimethoxy-1,2,2-triphenyldisilane, 1,1,2-triethoxy-1,2,2-triphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane and 1,2-diethoxy-1,1,2,2-tetraphenyldisilane.

Examples of the compound represented by the formula (2) wherein $R^7$ is $—(CH_2)_n—$ include bis(hexamethoxysilyl)methane, bis(hexaethoxysilyl)methane, bis(hexaphenoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, bis(ethoxydiphenylsilyl)methane, bis(hexamethoxysilyl)ethane, bis(hexaethoxysilyl)ethane, bis(hexaphenoxysilyl)ethane, bis(dimethoxymethylsilyl)ethane, bis(diethoxymethylsilyl)ethane, bis(dimethoxyphenylsilyl)ethane, bis(diethoxyphenylsilyl)ethane, bis(methoxydimethylsilyl)ethane, bis(ethoxydimethylsilyl)ethane, bis(methoxydiphenylsilyl)ethane, bis(ethoxydiphenylsilyl)ethane, 1,3-bis(hexamethoxysilyl)propane, 1,3-bis(hexaethoxysilyl)propane, 1,3-bis(hexaphenoxysilyl)propane, 1,3-bis(dimethoxymethylsilyl)propane, 1,3-bis(diethoxymethylsilyl)propane, 1,3-bis(dimethoxyphenylsilyl)propane, 1,3-bis(diethoxyphenylsilyl)propane, 1,3-bis(methoxydimethylsilyl)propane, 1,3-bis(ethoxydimethylsilyl)propane, 1,3-bis(methoxydiphenylsilyl)propane and 1,3-bis(ethoxydiphenylsilyl)propane. Of those, preferred compounds are hexamethoxydisilane, hexaethoxydisilane, hexaphenoxydisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, 1,2-diethoxy-1,1,2,2-tetraphenyldisilane, bis(hexamethoxysilyl)methane, bis(hexaethoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane and bis(ethoxydiphenylsilyl)methane.

At least one compound selected from the group consisting of ingredients (A-1) and ingredients (A-2) (hereinafter the compound is referred to as "hydrolyzable silane compound") preferably comprises a combination of a tetraalkoxysilane represented by the formula (1) wherein a is 0 and an alkyltrialkoxysilane represented by the formula (1) wherein a is 1 and $R^1$ is an alkyl group.

In the present invention, the hydrolyzable silane compound is dissolved in a solvent and then hydrolyzed and condensed usually in the presence of a catalyst and water to thereby obtain a product of hydrolysis and condensation.

In the hydrolytic condensation of ingredient (A), water is used in an amount of preferably from 0.25 to 3 moles, more preferably from 0.3 to 2.5 moles, per mole of the groups represented by $R^2O—$, $R^4O—$ and $R^5O—$ possessed by the hydrolyzable silane compound. If the amount of water added is within the range of from 0.25 to 3 mol, there is no possibility that coating film uniformity decreases and there is less possibility that storage stability of the composition for film formation deteriorates.

The water is preferably added intermittently or continuously.

Examples of the catalyst used in the present invention include metal chelate compounds, organic acids, inorganic acids, organic bases and inorganic bases.

Examples of the metal chelate compounds include titanium chelate compounds such as triethoxymono(acetylacetonato)titanium, tri-n-propoxymono(acetylacetonato)titanium, triisopropoxymono(acetylacetonato)titanium, tri-n-butoxymono(acetylacetonato)titanium, tri-sec-butoxymono(acetylacetonato)titanium, tri-tert-butoxymono(acetylacetonato)titanium, diethoxybis(acetylacetonato)titanium, di-n-propoxybis(acetylacetonato)titanium, diisopropoxybis(acetylacetonato)titanium, di-n-butoxybis(acetylacetonato)titanium, di-sec-butoxybis(acetylacetonato)titanium, di-tert-butoxybis(acetylacetonato)titanium, monoethoxytris(acetylacetonato)titanium, mono-n-propoxytris(acetylacetonato)titanium, monoisopropoxytris(acetylacetonato)titanium, mono-n-butoxytris(acetylacetonato)titanium, mono-sec-butoxytris(acetylacetonato)titanium, mono-tert-butoxytris(acetylacetonato)titanium, tetrakis(acetylacetonato)titanium, triethoxymono(ethylacetoacetato)titanium, tri-n-propoxymono(ethylacetoacetato)titanium, triisopropoxymono(ethylacetoacetato)titanium, tri-n-butoxymono(ethylacetoacetato)titanium, tri-sec-butoxymono(ethylacetoacetato)titanium, tri-tert-butoxymono(ethylacetoacetato)titanium, diethoxybis(ethylacetoacetato)titanium, di-n-propoxybis(ethylacetoacetato)titanium, diisopropoxybis(ethylacetoacetato)titanium, di-n-butoxybis(ethylacetoacetato)titanium, di-sec-butoxybis(ethylacetoacetato)titanium, di-tert-butoxybis(ethylacetoacetato)titanium, monoethoxytris(ethylacetoacetato)titanium, mono-n-propoxytris(ethylacetoacetato)titanium, monoisopropoxytris(ethylacetoacetato)titanium, mono-n-butoxytris(ethylacetoacetato)titanium, mono-sec-butoxytris(ethylacetoacetato)titanium, mono-tert-butoxytris(ethylacetoacetato)titanium, tetrakis(ethylacetoacetato)titanium, mono(acetylacetonato)tris(ethylacetoacetato)titanium, bis(acetylacetonato)bis(ethylacetoacetato)titanium and tris(acetylacetonato)mono(ethylacetoacetato)titanium; zirconium chelate compounds such as triethoxymono(acetylacetonato)zirconium, tri-n-propoxymono(acetylacetonato)zirconium, triisopropoxymono(acetylacetonato)zirconium, tri-n-butoxymono(acetylacetonato)zirconium, tri-sec-butoxymono (acetylacetonato)zirconium, tri-tert-butoxymono (acetylacetonato)zirconium, diethoxybis(acetylacetonato) zirconium, di-n-propoxybis(acetylacetonato)zirconium, diisopropoxybis(acetylacetonato)zirconium, di-n-butoxybis (acetylacetonato)zirconium, di-sec-butoxybis (acetylacetonato)zirconium, di-tert-butoxybis (acetylacetonato)zirconium, monoethoxytris (acetylacetonato)zirconium, mono-n-propoxytris (acetylacetonato)zirconium, monoisopropoxytris (acetylacetonato)zirconium, mono-n-butoxytris (acetylacetonato)zirconium, mono-sec-butoxytris (acetylacetonato)zirconium, mono-tert-butoxytris (acetylacetonato)zirconium, tetrakis(acetylacetonato) zirconium, triethoxymono(ethylacetoacetato)zirconium, tri-n-propoxymono(ethylacetoacetato)zirconium, triisopropoxymono(ethylacetoacetato)zirconium, tri-n-butoxymono(ethylacetoacetato)zirconium, tri-sec-butoxymono(ethylacetoacetato)zirconium, tri-tert-butoxymono(ethylacetoacetato)zirconium, diethoxybis (ethylacetoacetato)zirconium, di-n-propoxybis (ethylacetoacetato)zirconium, diisopropoxybis (ethylacetoacetato)zirconium, di-n-butoxybis (ethylacetoacetato)zirconium, di-sec-butoxybis (ethylacetoacetato)zirconium, di-tert-butoxybis (ethylacetoacetato)zirconium, monoethoxytris (ethylacetoacetato)zirconium, mono-n-propoxytris (ethylacetoacetato)zirconium, monoisopropoxytris (ethylacetoacetato)zirconium, mono-n-butoxytris (ethylacetoacetato)zirconium, mono-sec-butoxytris (ethylacetoacetato)zirconium, mono-tert-butoxytris (ethylacetoacetato)zirconium, tetrakis(ethylacetoacetato) zirconium, mono(acetylacetonato)tris(ethylacetoacetato) zirconium, bis(acetylacetonato)bis(ethylacetoacetato) zirconium and tris(acetylacetonato)mono(ethylacetoacetato) zirconium; and aluminum chelate compounds such as tris (acetylacetonato)aluminum and tris(ethylacetoacetato) aluminum.

Examples of the organic acids include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linoleic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acids, phthalic acid, fumaric acid, citric acid and tartaric acid.

Examples of the inorganic acids include hydrochloric acid, nitric acid, sulfuric acid, hydrofluoric acid and phosphoric acid.

Examples of the organic bases include pyridine, pyrrole, piperazine, pyrrolidine, piperidine, picoline, trimethylamine, triethylamine, monoethanolamine, diethanolamine, dimethylmonoethanolamine and monomethyldiethanolamine, triethanolamine.

Examples of the inorganic bases include ammonia, sodium hydroxide, potassium hydroxide, barium hydroxide, and calcium hydroxide.

Of those, preferred catalysts are metal chelate compounds, organic acids and inorganic acids. More preferred catalysts are titanium chelate compounds and organic acids. Those catalysts may be used alone or as a mixture of two or more thereof.

The amount of the catalyst used is generally from 0.001 to 10 parts by weight, preferably from 0.01 to 10 parts by weight, per 100 parts by weight of ingredient (A) (in terms of the product of complete hydrolysis and condensation)

The catalyst may be added beforehand to the solvent, or may be dissolved or dispersed in the water to be added.

In the present invention, all of the $R^2O$— group, $R^4O$— group and $R^5O$— group contained in the hydrolyzable silane compound, need not be hydrolyzed. Namely, the term "hydrolysis" used herein means that a hydrolyzate in which, for example, only one of these hydrolyzable groups or two or more thereof have been hydrolyzed is produced or a mixture of such hydrolyzates is produced.

In the production process according to the present invention, the hydrolyzable silane compound may be condensed after hydrolysis. In the present invention, the condensation produces a condensate in which silanol groups of the hydrolyzate of the hydrolyzable silane compound have undergone condensation to form Si—O—Si bonds. However, all the silanol groups need not have undergone condensation in the present invention. Namely, the term "condensation" used herein includes the production of a condensate in which a slight proportion of the silanol groups have been condensed and the production of a mixture of condensates which differ in the degree of condensation.

In the present invention, the temperature at which the hydrolyzable silane compound is hydrolyzed is generally from 0 to 100° C., preferably from 15 to 80° C.

The product of hydrolysis and condensation has a weight average molecular weight, calculated for standard polystyrene, of generally about from 600 to 120,000, preferably from 700 to 120,000, more preferably from 1,000 to 120,000.

The solvent used for hydrolyzing the hydrolyzable silane compound is preferably a compound represented by the formula (3) which will be described hereinafter. However, solvents other than the compounds represented by the formula (3) can be used.

Examples of the solvents other than the compounds represented by the formula (3) include aliphatic hydrocarbon solvents such as n-pentane, isopentane, n-hexane, isohexane, n-heptane, isoheptane, 2,2,4-trimethylpentane, n-octane, isooctane, cyclohexane and methylcyclohexane; aromatic hydrocarbon solvents such as benzene, toluene, xylene, ethylbenzene, trimethylbenzene, methylethylbenzene, n-propylbenzene, isopropylbenzene, diethylbenzene, isobutylbenzene, triethylbenzene, diisopropylbenzene, n-amylnaphthalene and trimethylbenzene; ketone solvents such as acetone, methyl ethyl ketone, methyl n-propyl ketone, methyl n-butyl ketone, diethyl ketone, methyl isobutyl ketone, methyl n-pentyl ketone, ethyl n-butyl ketone, methyl n-hexyl ketone, diisobutyl ketone, trimethylnonanone, cyclohexanone, 2-hexanone, methylcyclohexanone, 2,4-pentanedione, acetonylacetone, diacetone alcohol, acetophenone and fenchone; ether solvents such as ethyl ether, isopropyl ether, n-butyl ether, n-hexyl ether, 2-ethylhexyl ether, ethylene oxide, 1,2-propylene oxide, dioxolane, 4-methyldioxolane, dioxane, dimethyldioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethylbutyl ether, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxytriglycol, tetraethylene glycol di-n-butyl ether, tetrahydrofuran and 2-methyltetrahydrofuran; ester solvents such as diethyl carbonate, methyl acetate, ethyl acetate, γ-butyrolactone, γ-valerolactone, n-propyl acetate, isopropyl acetate, n-butyl acetate, isobutyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate and diethyl phthalate; nitrogen-containing solvents such as N-methylformamide, N,N-dimethylformamide, N,N-diethylformamide, acetamide, N-methylacetamide, N,N--dimethylacetamide, N-methylpropionamide and N-methylpyrrolidone; and sulfur-containing solvents such as dimethyl sulfide, diethyl sulfide, thiophene, tetrahydrothiophene, dimethyl sulfoxide, sulfolane and 1,3-propanesultone.

The composition for film formation of the present invention comprises the product of hydrolysis and condensation (A) described above and a compound (B) represented by the following formula (3):

$$R^8O(CHCH_3CH_2O)_eR^9 \quad (3)$$

wherein $R^8$ and $R^9$ each independently represent hydrogen atom or a monovalent organic group selected from alkyl groups having 1 to 4 carbon atoms and $CH_3CO$—, provided that one of $R^8$ and $R^9$ is not hydrogen atom; and e represents an integer of 1 or 2.

Examples of the compound (B) represented by the formula (3) include propylene glycol monomethyl ether, propylene glycol monoethyl ether, propylene glycol monopropyl ether, propylene glycol monobutyl ether, propylene glycol dimethyl ether, propylene glycol diethyl ether, propylene glycol dipropyl ether, propylene glycol dibutyl ether, dipropylene glycol monomethyl ether, dipropylene glycol monoethyl ether, dipropylene glycol monopropyl ether, dipropylene glycol monobutyl ether, dipropylene glycol dimethyl ether, dipropylene glycol diethyl ether, dipropylene glycol dipropyl ether, dipropylene glycol dibutyl ether, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, dipropylene glycol monopropyl ether acetate, dipropylene glycol monobutyl ether acetate, propylene glycol diacetate, dipropylene glycol diacetate, 1-methoxy-2-propanol, 1-ethoxy-2-propanol, 1-isopropoxy-2-propanol, 1-n-propoxy-2-propanol, 1-isobutoxy-2-propanol, 1-n-butoxy-2-propanol and 1-tert-butoxy-2-propanol. Of those, especially preferred compounds are propylene glycol monoalkyl ethers such as propylene glycol monomethyl ether, propylene glycol monoethyl ether, propylene glycol monopropyl ether and propylene glycol monobutyl ether. Those may be used alone or as a mixture of two or more thereof.

There is the case that a propylene glycol monoalkyl ether is a mixture of a compound represented by the following formula (4) and a compound represented by the following formula (5):

$$R^{10}OCH_2CHCH_3OH \quad (4)$$

$$R^{10}OCHCH_3CH_2OH \quad (5)$$

wherein $R^{10}$ represents an alkyl group having 1 to 4 carbon atoms.

It is preferred in the present invention that the amount of the compound represented by the formula (5) be smaller than 10% by weight, preferably smaller than 8% by weight, more preferably smaller than 5% by weight, most preferably smaller than 2% by weight, based on the weight of the sum of the solvents represented by the formulae (4) and (5), from the standpoint of attaining better coating film uniformity.

Examples of the solvent represented by the formula (5) include 2-methoxypropanol, 2-ethoxypropanol, 2-isopropoxypropanol, 2-n-propoxypropanol, 2-isobutoxypropanol, 2-n-butoxypropanol and 2-tert-butoxypropanol.

Distillation is necessary to remove the compound represented by the formula (5) from the compound represented by the formula (3) in the present invention.

Although the compound represented by the formula (3) may contain propylene glycol, dipropylene glycol monoalkyl ethers and dipropylene glycol as impurities, it is preferred to remove those impurity compounds from the compound represented by the formula (3).

In the composition for film formation of the present invention, the content of propylene glycol, dipropylene glycol monoalkyl ethers and dipropylene glycol is preferably 10,000 ppm or lower of the composition. This is necessary to improve the uniformity of the coating film to be formed from the composition obtained.

In the case where a compound represented by the formula (3) was used in hydrolyzing the hydrolyzable silane compound in the present invention, the resulting reaction mixture which has undergone hydrolysis and condensation can be used as the film-forming composition of the present invention without any treatment.

In the case where the hydrolyzable silane compound has been hydrolyzed and condensed using a solvent not represented by the formula (3), it is necessary to replace the solvent with the compound represented by the formula (3) after production of the product of hydrolysis and condensation.

This solvent replacement is conducted so as to regulate the solid content of the film-forming composition to a value within the range which will be shown hereinafter. Besides the solid content regulation, it is preferred to regulate the content of alcohols having a boiling point of 100° C. or lower and the contents of water, sodium and iron so as to be within the respective ranges shown below.

In the composition for film formation of the present invention, the content of alcohols having a boiling point of 100° C. or lower is preferably 6% by weight or lower, more preferably 4% by weight or lower, most preferably 2% by weight or lower, based on the weight of the composition, from the standpoint of coating film uniformity. Alcohols having a boiling point of 100° C. or lower may generate when the hydrolyzable silane compound is hydrolyzed and condensed. It is therefore preferred to diminish those alcohols by distillation or another technique so that the content thereof is reduced to or below 6% by weight based on the weight of the composition for film formation.

The content of water in the composition for film formation is preferably 15% by weight or lower, more preferably 10% by weight or lower, most preferably 5% by weight or lower, based on the weight of the composition, from the standpoint of coating film uniformity. There is the case where the water used for hydrolyzing the hydrolyzable silane compound remains. It is preferred to diminish the water by distillation or another technique so that the content thereof is reduced to or below 15% by weight.

Furthermore, the contents of sodium and iron in the composition for film formation each are preferably 15 ppb or lower, more preferably 10 ppb or lower, from the standpoint of obtaining a coating film having low leakage current. There is the case where sodium and iron come into the composition from starting materials used. It is therefore preferred to purify the starting materials by distillation or another technique.

The composition for film formation of the present invention may further contain the following ingredients.

β-Diketones

Examples of β-diketones that may be contained include acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione, 2,2,6,6-tetramethyl-3,5-heptanedione and 1,1,1,5,5,5-hexafluoro-2,4-heptanedione. Such β-diketones may be added alone or in combination of two or more thereof.

The β-diketone content in the composition for film formation of the present invention is generally from 0.1 to 100 parts by weight, preferably from 0.2 to 80 parts by weight, per 100 parts by weight of the total amount of ingredient (A) (in terms of the completely product of hydrolysis and condensation).

The addition of a β-diketone in such an amount is effective to obtain a certain degree of storage stability and also in that there is less possibility that properties of the film-forming composition, including coating film uniformity, may be impaired.

It is preferred to add the β-diketone after the hydrolysis and condensation reactions of the hydrolyzable silane compound.

Polyethers

Examples of polyethers that may be contained include polyalkylene glycol compounds having repeating units each having 2 to 12 carbon atoms. Specific examples thereof include polyethylene glycol, polypropylene glycol, polytrimethylene glycol, polytetramethylene glycol, polypentamethylene glycol, polyhexamethylene glycol, polyethylene glycol/polypropylene glycol block copolymers, polyethylene glycol/polytetramethylene glycol block copolymers, and polyethylene glycol/polypropylene glycol/polyethylene glycol block copolymers; derivatives of those glycols and copolymers, such as the methyl ethers, ethyl ethers, propyl ethers, trimethoxysilyl ethers, triethoxysilyl ethers, tripropoxysilyl ethers, trimethoxysilylmethyl ethers, triethoxysilylmethyl ethers, 2-trimethoxysilylethyl ethers, 2-triethoxysilylethyl ethers, 3-trimethoxysilylpropyl ethers, and 3-triethoxysilylpropyl ethers of those glycols and copolymers; polyethylene glycol alkyl ethers such as polyethylene glycol monopentyl ether, polyethylene glycol monohexyl ether, polyethylene glycol monoheptyl ether, polyethylene glycol monooctyl ether, polyethylene glycol monononyl ether, polyethylene glycol monodecanyl ether, polyethylene glycol monoundecanyl ether, polyethylene glycol monododecanyl ether, polyethylene glycol monotridecanyl ether, polyethylene glycol monotetradecanyl ether, polyethylene glycol monopentadecanyl ether, polyethylene glycol monohexadecanyl ether, polyethylene glycol monoheptadecanyl ether, polyethylene glycol monooctadecanyl ether, polyethylene glycol monononadecanyl ether, polyethylene glycol monoeicosanyl ether, polyethylene glycol monoheneicosanyl ether, polyethylene glycol monodecosanyl ether, polyethylene glycol monotricosanyl ether, polyethylene glycol monotetracosanyl ether, polyethylene glycol monopentacosanyl ether, polyethylene glycol monohexacosanyl ether, polyethylene glycol monoheptacosanyl ether, polyethylene glycol monooctacosanyl ether, polyethylene glycol monononacosanyl ether, and polyethylene glycol monotriacontanyl ether; polyethylene glycol alkyl ether derivatives such as the methyl ethers, ethyl ethers, propyl ethers, trimethoxysilyl ethers, triethoxysilyl ethers, tripropoxysilyl ethers, trimethoxysilylmethyl ethers, triethoxysilylmethyl ethers, 2-trimethoxysilylethyl ethers, 2-triethoxysilylethyl ethers, 3-trimethoxysilylpropyl ethers, and 3-triethoxysilylpropyl ethers of those polyethylene glycol alkyl ethers; polyethylene glycol p-alkylphenyl ethers such as polyethylene glycol mono-p-methylphenyl ether, polyethylene glycol mono-p-ethylphenyl ether, polyethylene glycol mono-p-propylphenyl ether, polyethylene glycol mono-p-butylphenyl ether, polyethylene glycol mono-p-pentylphenyl ether, polyethylene glycol mono-p-hexylphenyl ether, polyethylene glycol mono-p-heptylphenyl ether, polyethylene glycol mono-p-octylphenyl ether, polyethylene glycol mono-p-nonylphenyl ether, polyethylene glycol mono-p-decanylphenyl ether, polyethylene glycol mono-p-undecanylphenyl ether, polyethylene glycol mono-p-dodecanylphenyl ether, polyethylene glycol mono-p-tridecanylphenyl ether, polyethylene glycol mono-p-tetradecanylphenyl ether, polyethylene glycol mono-p-pentadecanylphenyl ether, polyethylene glycol mono-p-hexadecanylphenyl ether, polyethylene glycol mono-p-heptadecanylphenyl ether, polyethylene glycol mono-p-octadecanylphenyl ether, polyethylene glycol mono-p-nonadecanylphenyl ether, polyethylene glycol mono-p-eicosanylphenyl ether, polyethylene glycol mono-p-heneicosanylphenyl ether, polyethylene glycol mono-p-docosanylphenyl ether, polyethylene glycol mono-p-tricosanylphenyl ether and polyethylene glycol mono-p-tetracosanylphenyl ether; polyethylene glycol p-alkylphenyl ether derivatives such as the methyl ethers, ethyl ethers, propyl ethers, trimethoxysilyl ethers, triethoxysilyl ethers, tripropoxysilyl ethers, trimethoxysilylmethyl ethers, triethoxysilylmethyl ethers, 2-trimethoxysilylethyl ethers, 2-triethoxysilylethyl ethers, 3-trimethoxysilylpropyl ethers and 3-triethoxysilylpropyl ethers of those polyethylene glycol p-alkylphenyl ethers; polyethylene glycol alkyl esters such as polyethylene glycol monopentanoate, polyethylene glycol monohexanoate, polyethylene glycol monoheptanoate, polyethylene glycol monooctanoate, polyethylene glycol monononanoate, polyethylene glycol monodecanoate, polyethylene glycol monoundecanoate, polyethylene glycol monododecanoate, polyethylene glycol monotridecanoate, polyethylene glycol monotetradecanoate, polyethylene glycol monopentadecanoate, polyethylene glycol monohexadecanoate, polyethylene glycol monoheptadecanoate, polyethylene glycol monooctadecanoate, polyethylene glycol monononadecanoate, polyethylene glycol monoeicosanoate, polyethylene glycol monoheneicosanoate, polyethylene glycol monodocosanoate, polyethylene glycol monotricosanoate, polyethylene glycol monotetracosanoate, polyethylene glycol monopentacosanoate, polyethylene glycol monohexacosanoate, polyethylene glycol monoheptacosanoate, polyethylene glycol monooctacosanoate, polyethylene glycol monononacosanoate and polyethylene glycol monotriacontanoate; and polyethylene glycol alkyl ester derivatives such as the methyl ethers, ethyl ethers, propyl ethers, trimethoxysilyl ethers, triethoxysilyl ethers, tripropoxysilyl ethers, trimethoxysilylmethyl ethers, triethoxysilylmethyl ethers, 2-trimethoxysilylethyl ethers, 2-triethoxysilylethyl ethers, 3-trimethoxysilylpropyl ethers and 3-triethoxysilylpropyl ethers of those polyethylene glycol alkyl esters.

Those polyethers can be used alone or in combination of two or more thereof.

Those polyethers have a weight average molecular weight, calculated for standard polystyrene, of generally from 300 to 300,000, preferably from 300 to 200,000, more preferably from 300 to 100,000.

Poly(Meth)Acrylates

Examples of poly(meth)acrylates that may be contained include (meth)acrylic polymers having at least one kind of groups selected from the group consisting of polyoxyethyl, polyoxypropyl, amide, hydroxyl and carboxyl groups. Those (meth)acrylic polymers are formed from monomers comprising acrylic or methacrylic acid, an acrylic or methacrylic acid derivative having any of those functional groups and an acrylic or methacrylic ester having none of those functional groups.

The poly(meth)acrylates for use in the present invention have a number average molecular weight, calculated for standard polystyrene, of generally from 1,000 to 200,000, preferably from 1,000 to 50,000.

In the present invention, use of a polyether or poly(meth) acrylate is effective to obtain a coating film having low density and low dielectric constant. This coating film is useful as an interlayer insulating film in semiconductor devices and the like.

The amount of the polyether or poly(meth)acrylate used is generally from 1 to 80 parts by weight, preferably from 5 to 65 parts by weight, per 100 parts by weight of ingredient (A) (in terms of the completely product of hydrolysis and condensation). If the amount the polyether or poly(meth) acrylate used is smaller than 1 part by weight, the effect of reducing dielectric constant is insufficient. On the other hand, if the amount thereof exceeds 80 parts by weight, mechanical strength of the coating film decreases.

Besides polyethers and poly(meth)acrylates, polyesters, polycarbonates, polyanhydrides and the like can also be used.

Surfactants

Examples of surfactants that may be contained include nonionic surfactants, anionic surfactants, cationic surfactants and amphoteric surfactants, and further include fluorochemical surfactants, silicone surfactants, poly(alkylene oxide) surfactants and poly(meth)acrylate surfactants. Preferred of those are fluorochemical surfactants and silicone surfactants.

The fluorochemical surfactants are ones comprising a compound having a fluoroalkyl or fluoroalkylene group in at least one position selected from the ends, main chain and side chains, and the examples thereof include 1,1,2,2-tetrafluorooctyl 1,1,2,$^{2}$-tetrafluoropropyl ether, 1,1,2,2-tetrafluorooctyl hexyl ether, octaethylene glycol di(1,1,2,2-tetrafluorobutyl) ether, hexaethylene glycol (1,1,2,2,3,3-hexafluoropentyl) ether, octapropylene glycol di(1,1,2,2-tetrafluorobutyl) ether, hexapropylene glycol di(1,1,2,2,3,3-hexafluoropentyl) ether, sodium perfluorododecylsulfonate, 1,1,2,2,8,8,9,9,10,10-decafluorododecane, 1,1,2,2,3,3-hexafluorodecane, N-[3-perfluorooctanesulfonamido) propyl]-N,N'-dimethyl-N-carboxymethylene ammonium betaine, perfluoroalkylsulfonamidopropyltrimethyl ammonium salts, perfluoroalkyl-N-ethylsulfonyl glycine salts, bis (N-perfluorooctylsulfonyl-N-ethylaminoethyl) phosphate and monoperfluoroalkylethyl phosphates.

Commercially available products of such fluorochemical surfactants include products available under the trade names of Megafac F142D, F172, F173, and F183 (manufactured by Dainippon Ink & Chemicals, Inc.); F-Top EF301, EF303 and EF352 (manufactured by New Akita Chemical Company); Fluorad FC-430 and FC-431 (manufactured by Sumitomo 3M Ltd.) ; Asahi Guard AG710 and Surflon S-382, SC-101, SC-102, SC-103, SC-104, SC-105 and SC-106 (manufactured by Asahi Glass Co., Ltd.); BM-1000 and BM-1100 (manufactured by Yusho K.K.); and NBX-15 (manufactured by NEOS Co., Ltd.). Especially preferred of those are Megafac F172, BM-1000, BM-1100 and NBX-15.

Examples of the silicone surfactants include SH7PA, SH21PA, SH30PA and ST94PA (all manufactured by Dow Corning Toray Silicone Co., Ltd.). Especially preferred are polymers represented by the following formula (6), which correspond to SH28PA and SH30PA in the above surfactants:

(6)

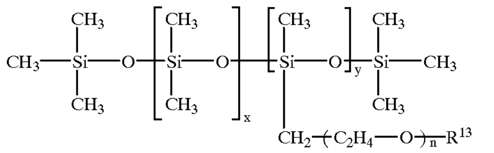

wherein $R^{12}$ represents hydrogen atom or an alkyl group having 1 to 5 carbon atoms; n is an integer of 1 to 20; and x and y each independently are an integer of 2 to 100.

The amount of the surfactant used is generally from 0.0001 to 10 parts by weight per 100 parts by weight of ingredient (A) (in terms of the completely product of hydrolysis and condensation).

The composition for film formation of the present invention has a total solid concentration of preferably from 2 to 30% by weight. The solid concentration thereof is suitably regulated according to purposes of the use thereof. When the composition has a total solid concentration of from 2 to 30% by weight, the composition not only gives a coating film having an appropriate thickness but has better storage stability.

The composition of the present invention is applied to a substrate, such as a silicon wafer, $SiO_2$ wafer or SiN wafer, by a coating technique such as spin coating, dip coating, roll coating or spraying.

This coating, operation can be conducted so as to form a coating film having a thickness on a dry basis of about from 0.05 to 1.5 $\mu$m in the case of single coating or about from 0.1 to 3 $\mu$m in the case of double coating. Thereafter, the wet coating film is dried at room temperature or dried with heating at a temperature of about from 80 to 600° C. usually for about from 5 to 240 minutes. Thus, a vitreous or macromolecular weight insulating film can be formed.

The heating can be conducted with a hot plate, oven, furnace or the like, for example under atmospheric pressure, in a nitrogen or argon atmosphere, under vacuum, or under reduced pressure having controlled oxygen concentration.

The interlayer insulating film thus obtained has excellent insulating properties of a coating film and has also excellent uniformity, dielectric constant characteristics, cracking resistance and surface hardness of a coating film. Consequently, this coating film is useful in applications such as interlayer insulating films, etching stopper films and anti-reflection films for semiconductor devices such as LSIs, system LSIs, DRAMs, SDRAMs, RDRAMs and D-RDRAMs, protective films such as surface coat films for semiconductor devices, interlayer insulating films for multilayered printed circuit boards, and protective or insulating films for liquid-crystal display devices.

The present invention will be explained below in more detail by reference to the following Examples, but it should be understood that the invention is not construed as being limited thereto. Unless otherwise indicated, all "parts" and "percents" are by weight.

The composition for film formation obtained in each Example and Comparative Example was evaluated by the following method.

Weight Average Molecular Weight (Mw)

Measured by gel permeation chromatography (GPC) under the following conditions.

Sample: One gram of a product of hydrolysis and condensation was dissolved in 100 cc of tetrahydrofuran as a solvent to prepare a sample.

Standard polystyrene: Standard polystyrene manufactured by Pressure Chemical, U.S.A., was used.

Apparatus: A high-performance gel permeation chromatograph for high-temperature use (Model 150-C ALC/GPC) manufactured by Waters Inc., U.S.A.

Column: SHODEX A-80M (length, 50 cm), manufactured by Showa Denko K.K.

Measuring temperature: 40° C.

Flow rate: 1 cc/min

SYNTHESIS EXAMPLE 1

In 135 g of propylene glycol monopropyl ether which had been purified twice by distillation with a quartz vessel were dissolved 135.7 g of methyltrimethoxysilane, 48.2 g of bis(triethoxysilyl)methane and 1.1 g of diisopropoxytitanium bisethylacetylacetate in a separable flask made of quartz. This solution was stirred with Three-One Motor and the solution temperature was maintained at 60° C. 75 g of ion-exchanged water was added to the solution over 1 hour. The resulting mixture was reacted at 60° C. for 2 hours and then cooled to room temperature. To this reaction mixture was added 190 g of propylene glycol monopropyl ether which had been purified twice by distillation with a quartz vessel. 190 g of a solution containing methanol and ethanol was removed from the resulting reaction mixture by evaporation at 50° C. to thereby obtain a reaction mixture (1).

A condensate thus obtained had a weight average molecular weight of 5,700.

SYNTHESIS EXAMPLE 2

In 159 g of propylene glycol monomethyl ether which had been purified twice by distillation with a quartz vessel were dissolved 101.8 g of methyltrimethoxysilane and 70.4 g of 1,1,3,3-tetraethoxy-1,3-dimethylsiloxane in a separable flask made of quartz. This solution was stirred with Three-One Motor and the solution temperature was maintained at 60° C. 70 g of ion-exchanged water containing 4.4 g of maleic acid dissolved therein was added to the solution over 1 hour. The resulting mixture was reacted at 60° C. for 2 hours and then cooled to room temperature. To this reaction mixture was added 210 g of propylene glycol monomethyl ether which had been purified twice by distillation with a quartz vessel. 210 g of a solution containing methanol and ethanol was removed from the resulting reaction mixture by evaporation at 50° C. to thereby obtain a reaction mixture (2).

A condensate thus obtained had a weight average molecular weight of 4,000.

SYNTHESIS EXAMPLE 3

In 290 g of propylene glycol monopropyl ether which had been purified twice by distillation with a quartz vessel were dissolved 77.04 g of methyltrimethoxysilane, 24.05 g of tetramethoxysilane and 0.48 g of tetrakis(acetylacetonato) titanium in a separable flask made of quartz. This solution was stirred with Three-One Motor and the solution temperature was maintained at 60° C. 84. g of ion-exchanged water was added to the solution over 1 hour. The resulting mixture was reacted at 60° C. for 2 hours, and 25 g of acetylacetone was added thereto. This mixture was reacted for 30 minutes and then cooled to room temperature. 149 g of a solution containing methanol and water was removed from the resulting reaction mixture by evaporation at 50° C. to thereby obtain a reaction mixture (3).

A condensate thus obtained had a weight average molecular weight of 8,900.

SYNTHESIS EXAMPLE 4

The same procedure as in Synthesis Example 3 was followed, except that propylene glycol monoethyl ether which had been purified twice by distillation with a quartz vessel was used in place of the propylene glycol monopropyl ether. Thus, a reaction mixture (4) was obtained.

A condensate thus obtained had a weight average molecular weight of 6,800.

SYNTHESIS EXAMPLE 5

The same procedure as in Synthesis Example 3 was followed, except that tri (ethylacetoacetato) aluminum was used in place of the tetrakis(acetylacetonato)titanium. Thus, a reaction mixture (5) was obtained.

A condensate thus obtained had a weight average molecular weight of 4,800.

SYNTHESIS EXAMPLE 6

The same reactions as in Synthesis Example 1 were followed, except that propylene glycol monopropyl ether which had not been purified by distillation was used. Thus, a reaction mixture (6) was obtained which contained a condensate having a weight average molecular weight of 5,500.

EXAMPLE 1

The reaction mixture (1) obtained in Synthesis Example 1 was filtered through a Teflon filter having an opening diameter of 0.2 μm to obtain a composition for film formation of the present invention.

EXAMPLE 2

A composition for film formation was obtained in the same manner as in Example 1, except that the reaction mixture (2) obtained in Synthesis Example 2 was used.

EXAMPLE 3

A composition for film formation was obtained in the same manner as in Example 1, except for using a solution prepared by adding 1 g of acetylacetone to 100 g of the reaction mixture (1) obtained in Synthesis Example 1.

EXAMPLE 4

A composition for film formation was obtained in the same manner as in Example 1, except for using a solution prepared by adding 10 g of poly(isopropyl methacrylate) having a weight average molecular weight of about 4,000 to 100 g of the reaction mixture (2) obtained in Synthesis Example 2.

EXAMPLE 5

A composition for film formation was obtained in the same manner as in Example 1, except for using a solution prepared by adding 10 g of polyethylene glycol having a weight average molecular weight of about 2,000 to 100 g of the reaction mixture (2) obtained in Synthesis Example 2.

EXAMPLE 6

A composition for film formation was obtained in the same manner as in Example 1, except that the reaction mixture (3) obtained in Synthesis Example 3 was used.

EXAMPLE 7

A composition for film formation was obtained in the same manner as in Example 1, except that 0.006 g of a fluorochemical surfactant (trade name, NBX-15) was added to 100 g of the reaction mixture (4) obtained in Synthesis Example 4.

EXAMPLE 8

A composition for film formation was obtained in the same manner as in Example 1, except that 0.006 g of a silicone surfactant (trade name, SH28PA) was added to 100 g of the reaction mixture (5) obtained in Synthesis Example 5.

Comparative Example 1

A composition for film formation was obtained in the same manner as in Example 1, except that the reaction mixture (6) obtained in Synthesis Example 6 was used.

Evaluation

The compositions for film formation obtained above were evaluated in the following manners. The results obtained are shown in Tables 1 and 2.

Propylene Glycol (PG) Content

Each composition for film formation was analyzed by gas chromatography.

Na and Fe Contents

Each composition for film formation was analyzed by flameless atomic absorption spectroscopy.

Water Content

Each composition for film formation was analyzed by Karl Fischer's method.

Content of Alcohols having Boiling Point of 100° C. or Lower

Each composition for film formation was analyzed by gas chromatography.

Isomer Content

The organic solvent was analyzed by gas chromatography.

Coating Film Uniformity

Each composition for film formation was applied to an 8 inch silicon wafer with a spin coater under the conditions of a rotational speed-of 1,700 rpm for 30 seconds. The silicon wafer coated with the film-forming composition was heated for 5 minutes with a hot plate maintained at a temperature of 95° C. to thereby remove the organic solvent.

This silicon wafer coated with the film-forming composition was heated for 5-minutes with a hot plate maintained at a temperature of 210° C. to thereby form a coating film on the silicon wafer. The thickness of the coating film thus obtained was measured with an ellipsometer (Spectra Laser 200, manufactured by Rudolph Technologies) in fifty positions within the coating film plane. The 3B of the found film thickness values was calculated.

Film Thickness Change through Storage

Each composition for film formation immediately after preparation and the same composition for film formation which had been stored at 37° C. for 35 days were applied on an 8 inch silicon wafer and dried under the following conditions to form a silica film. The term "immediately after preparation" means that the time period which had passed since completion of the preparation of the film-forming composition was not longer than 6 hours.

The composition for film formation was applied to an 8 inch silicon wafer with a spin coater under the conditions of a rotational speed of 1,700 rpm for 30 seconds. The silicon wafer coated with the film-forming composition was heated for 5 minutes with a hot plate maintained at a temperature of 95° C. to thereby remove the organic solvent.

This silicon wafer coated with the film-forming composition was heated for 5 minutes with a hot plate maintained at a temperature of 210° C. to thereby form a coating film on the silicon wafer. The thickness of the coating film thus obtained was measured with an ellipsometer (Spectra Laser 200, manufactured by Rudolph Technologies) in fifty positions within the coating film plane. The storage stability of the composition was evaluated based on the film thickness increase determined from the found film thickness values using the following equation.

Film thickness increase (%)=((Film thickness after storage)−(Film thickness immediately after preparation))÷(Film thickness immediately after preparation)×100

Film thickness increase of 10% or lower shows that storage stability was satisfactory, while film thickness increase exceeding 10% shows that storage stability was poor.

Dielectric Constant

Each composition for film formation was applied to an 8 inch silicon wafer by a spin coating method. This coated substrate was dried on a hot plate first at 95° C. for 5 minutes and then at 210° C. for 5 minutes, and subsequently burned in a vacuum oven at 450° C. for 70 minutes. Aluminum was vapor-deposited on the resulting substrate to produce a substrate for dielectric constant evaluation. The dielectric constant of the coating film was calculated from the value of capacitance determined at 10 kHz with electrodes HP16451B and precision LCR meter HP4284A, both manufactured-by Yokogawa-Hewlett-Packerd, Ltd.

Leakage Current

Each composition for film formation was applied to an 8 inch silicon wafer by a spin coating method. This coated substrate was dried on a hot plate first at 95° C. for 5 minutes and then at 210° C. for 5 minutes, and subsequently burned in a vacuum oven at 450° C. for 70 minutes. Aluminum was vapor-deposited on the resulting substrate to produce a substrate for leakage current evaluation. Leakage current was determined with 6517A, manufactured by Keithley K.K., by measuring the current which flowed when a voltage of 0.2 MV/cm was applied to the coating film.

In order that a coating film can be used as an insulating film for semiconductors, the leakage current thereof should be less than $7\times10^{-10}$ A.

TABLE 1

| | PG content (ppm) | Na content (ppb) | Fe content (ppb) | Water content (wt %) | Content of alcohols having boiling point of 100° C. or lower (wt %) | Isomer content in organic solvent (wt %) |
|---|---|---|---|---|---|---|
| Example 1 | 200 | 1.2 | 1.8 | 0.8 | 0.6 | 1.2 |
| Example 2 | 205 | 1.8 | 2.2 | 1.2 | 0.7 | 1.2 |
| Example 3 | 198 | 1.1 | 1.7 | 1.2 | 0.8 | 1.2 |
| Example 4 | 205 | 2.5 | 3.3 | 1.4 | 0.8 | 1.1 |
| Example 5 | 205 | 3.4 | 5.2 | 1.5 | 0.9 | 1.2 |
| Example 6 | 204 | 1.7 | 2.1 | 1.0 | 0.7 | 1.2 |
| Example 7 | 208 | 1.9 | 2.4 | 2.5 | 1.1 | 2.3 |
| Example 8 | 201 | 1.3 | 1.7 | 1.2 | 0.8 | 1.1 |
| Comparative Example 1 | 15000 | 53 | 88 | 0.9 | 0.7 | 4.5 |

TABLE 2

| | Dielectric constant | Film thickness increase (%) | Coating film uniformity (nm) | Leakage current (A) |
|---|---|---|---|---|
| Example 1 | 2.69 | 4.3 | 8.4 | $1.2 \times 10^{-10}$ |
| Example 2 | 2.70 | 8.1 | 9.9 | $1.8 \times 10^{-10}$ |
| Example 3 | 2.70 | 3.9 | 8.4 | $1.5 \times 10^{-10}$ |
| Example 4 | 2.32 | 8.9 | 10.3 | $0.8 \times 10^{-10}$ |
| Example 5 | 2.22 | 9.1 | 10.2 | $0.6 \times 10^{-10}$ |
| Example 6 | 2.62 | 3.9 | 8.6 | $1.6 \times 10^{-10}$ |
| Example 7 | 2.62 | 4.4 | 7.2 | $1.2 \times 10^{-10}$ |
| Example 8 | 2.67 | 4.2 | 6.8 | $0.9 \times 10^{-10}$ |
| Comparative Example 1 | 3.02 | 13.4 | 40.2 | $19.5 \times 10^{-10}$ |

According to the present invention, a composition for film formation (interlayer insulating film material) having an excellent balance in coating film uniformity, storage stability, dielectric constant, leakage current and other properties can be provided by synthesizing an alkoxysilane in a specific solvent.

What is claimed is:

1. A composition for film formation which comprises:

(A) a product of hydrolysis and condensation obtained by hydrolyzing and condensing at least one compound selected from the group consisting of (A-1) compounds represented by the following formula (1):

$$R^1_aSi(OR^2)_{4-a} \quad (1)$$

wherein $R^1$ represents hydrogen atom, fluorine atom or a monovalent organic group; $R^2$ represents a monovalent organic group; and a is an integer of 0 to 2, and (A-2) compounds represented by the following formula (2):

$$R^3_b(R^4O)_{3-b}Si—(R^7)_d—Si(OR^5)_{3-c}R^6_c \quad (2)$$

wherein $R^3$, $R^4$, $R^5$ and $R^6$ may be the same or different and each represent a monovalent organic group; b and c may be the same or different and each represent a number of 0 to 2; $R^7$ represents oxygen atom or a group represented by $—(CH_2)_n—$, wherein n is 1 to 6; and d is 0 or 1; and (B) a compound represented by the following formula (3):

$$R^8O(CHCH_3CH_2O)_eR^9 \quad (3)$$

wherein $R^8$ and $R^9$ each independently represent hydrogen atom or a monovalent organic group selected from alkyl groups having 1 to 4 carbon atoms and $CH_3CO—$, provided that one of $R^8$ and $R^9$ is not hydrogen atom; and e is an integer of 1 or 2, and which further comprises at least one compound selected from the group consisting of β-diketones, polyethers and poly(meth)acrylates.

2. The composition for film formation as claimed in claim 1, wherein said ingredient (B) comprises compounds represented by the following formulae (4) and (5):

$$R^{10}OCH_2CHCH_3OH \quad (4)$$

$$R^{10}OCHCH_3CH_2OH \quad (5)$$

wherein $R^{10}$ represents an alkyl group having 1 to 4 carbon atoms.

3. The composition for film formation as claimed in claim 2, wherein an amount of the compound represented by general formula (5) is smaller than 10% by weight based on the weight of the sum of the compounds represented by the formulae (4) and (5).

4. The composition for film formation as claimed in claim 1, wherein said ingredient (A) is a product obtained by hydrolyzing at least one member selected from the group consisting of ingredients (A-1) and ingredients (A-2) in the presence of at least one member selected from the group consisting of acid catalysts, alkali catalysts and metal chelate compounds.

5. The composition for film formation as claimed in claim 1, wherein said composition has a water content of 15% by weight or lower based on the weight of the composition.

6. The composition for film formation as claimed in claim 1, wherein said composition contains alcohols having a boiling point of 100° C. or lower in an amount of 6% by weight or lower based on the weight of the composition.

7. The composition for film formation as claimed in claim 1, wherein said composition contains sodium and iron in an amount of 15 ppb or lower, respectively.

8. A material for insulating film formation which comprises the composition for film formation as claimed in claim 1.

9. A silica-based film obtained by curing the composition as claimed in claim 1.

10. A composition for film formation which comprises:

(A) a product of hydrolysis and condensation obtained by hydrolyzing and condensing at least one compound selected from the group consisting of (A-1) compounds represented by the following formula (1):

$$R^1_aSi(OR^2)_{4-a} \quad (1)$$

wherein $R^1$ represents hydrogen atom, fluorine atom or a monovalent organic group; $R^2$ represents a monovalent organic group; and a is an integer of 0 to 2, and (A-2) compounds represented by the following formula (2):

$$R^3_b(R^4O)_{3-b}Si—(R^7)_d—Si(OR^5)_{3-c}R^6_c \quad (2)$$

wherein $R^3$, $R^4$, $R^5$ and $R^6$ may be the same or different and each represent a monovalent organic group; b and c may be the same or different and each represent a number of 0 to 2; $R^7$ represents oxygen atom or a group represented by $-(CH_2)_n-$, wherein n is 1 to 6; and d is 0 or 1; and (B) a compound represented by the following formulae (4) and (5):

$$R^{10}OCH_2CHCH_3OH \quad (4)$$

$$R^{10}OCHCH_3CH_2OH \quad (5)$$

wherein $R^{10}$ represents an alkyl group having 1 to 4 carbon atoms.

11. The composition for film formation as claimed in claim 10, wherein an amount of the compound represented by general formula (5) is smaller than 10% by weight based on the weight of the sum of the compounds represented by the formulae (4) and (5).

12. The composition for film formation as claimed in claim 10, wherein said ingredient (A) is a product obtained by hydrolyzing at least one member selected from the group consisting of ingredients (A-1) and ingredients (A-2) in the presence of at least one member selected from the group consisting of acid catalysts, alkali catalysts and metal chelate compounds.

13. The composition for film formation as claimed in claim 10, which further comprises at least one compound selected from the group consisting of β-diketones, poly ethers and poly(meth)acrylates.

14. The composition for film formation as claimed in claim 10, wherein said composition has a water content of 15% by weight or lower based on the weight of the composition.

15. The composition for film formation as claimed in claim 10, wherein said composition contains alcohols having a boiling point of 100° C. or lower in an amount of 6% by weight or lower based on the weight of the composition.

16. The composition for film formation as claimed in claim 1, wherein said composition contains sodium and iron in an amount of 15 ppb or lower, respectively.

17. A material for insulating film formation which comprises the composition for film formation as claimed in claim 10.

18. A silica-based film obtained by curing the composition as claimed in claim 12.

19. A composition for film formation which comprises (A) a product of hydrolysis and condensation obtained by hydrolyzing and condensing at least one compound selected from the group consisting of (A-1) compounds represented by the following formula (1):

$$R^1_aSi(OR^2)_{4-a} \quad (1)$$

wherein $R^1$ represents hydrogen atom, fluorine atom or a monovalent organic group; $R^2$ represents a monovalent organic group; and a is an integer of 0 to 2, and (A-2) compounds represented by the following formula (2):

$$R^3_b(R^4O)_{3-b}Si-(R^7)_d-Si-(OR^5)_{3-c}R^6_c \quad (2)$$

wherein $R^3$, $R^4$, $R^5$ and $R^6$ may be the same or different and each represent a monovalent organic group; b and c may be the same or different and each represent a number of 0 to 2; $R^7$ represents oxygen atom or a group represented by $-(CH_2)_n-$, wherein n is 1 to 6; and d is 0 or 1; and (B) a compound represented by the following formula $$R^8O(CHCH_3CH_2O)_eR^9 \quad (3)$$

wherein $R^8$ and $R^9$ each independently represent hydrogen atom or a monovalent organic group selected from alkyl groups having 1 to 4 carbon atoms and $CH_3CO-$, provided that one of $R^8$ and $R^9$ is not hydrogen atom; and e is an integer of 1 or 2, wherein said composition contains propylene glycol, dipropylene glycol monoalkyl ethers and dipropylene glycol in a total amount of 10,000 ppm or lower.

20. The composition for film formation as claimed in claim 19, wherein said ingredient (B) comprises compounds represented by the following formulae (4) and (5):

$$R^{10}OCH_2CHCH_3OH \quad (4)$$

$$R^{10}OCHCH_3CH_2OH \quad (5)$$

wherein $R^{10}$ represents an alkyl group having 1 to 4 carbon atoms.

21. The composition for film formation as claimed in claim 20, wherein an amount of the compound represented by general formula (5) is smaller than 10% by weight based on the weight of the sum of the compounds represented by the formulae (4) and (5).

22. The composition for film formation as claimed in claim 19, wherein said ingredient (A) is a product obtained by hydrolyzing at least one member selected from the group consisting of ingredients (A-1) and ingredients (A-2) in the presence of at least one member selected from the group consisting of acid catalysts, alkali catalysts and metal chelate compounds.

23. The composition for film formation as claimed in claim 19, which further comprises at least one compound selected from the group consisting of β-diketones, polyethers and poly(meth)acrylates.

24. The composition for film formation as claimed in claim 19, wherein said composition has a water content of 15% by weight or lower based on the weight of the composition.

25. The composition for film formation as claimed in claim 19, wherein said composition contains alcohols having a boiling point of 100° C. or lower in an amount of 6% by weight or lower based on the weight of the composition.

26. The composition for film formation as claimed in claim 19, wherein said composition contains sodium and iron in an amount of 15 ppb or lower, respectively.

27. A material for insulating film formation which comprises the composition for film formation as claimed in claim 19.

28. A silica-based film obtained by curing the composition as claimed in claim 19.

* * * * *